(12) United States Patent
Shin et al.

(10) Patent No.: US 8,485,592 B2
(45) Date of Patent: Jul. 16, 2013

(54) FRONT CONNECTION STRUCTURE FOR VEHICLE BODY

(75) Inventors: Jang Ho Shin, Whasung-Si (KR); Yun Chang Kim, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/308,338

(22) Filed: Nov. 30, 2011

(65) Prior Publication Data

US 2012/0313398 A1  Dec. 13, 2012

(30) Foreign Application Priority Data

Jun. 8, 2011 (KR) ........................ 10-2011-0055106

(51) Int. Cl.
*B60R 19/02* (2006.01)
(52) U.S. Cl.
USPC ... 296/203.02; 293/149; 293/154; 296/187.1; 296/193.09
(58) Field of Classification Search
USPC ................. 293/102, 132, 133, 149, 151, 152, 293/154; 296/187.1, 193.09, 203.02, 187.01, 296/187.03, 187.09, 198, 203.01
See application file for complete search history.

(56) References Cited

U.S. PATENT DOCUMENTS

| | | | | |
|---|---|---|---|---|
| 3,738,696 A | * | 6/1973 | McLauchlan | 293/133 |
| 3,830,539 A | * | 8/1974 | Yoshie et al. | 293/149 |
| 3,907,352 A | * | 9/1975 | Spain et al. | 293/152 |
| 4,225,167 A | * | 9/1980 | Buettner et al. | 293/120 |
| 4,428,599 A | * | 1/1984 | Jahnle | 280/784 |
| 4,440,435 A | * | 4/1984 | Norlin | 296/187.09 |
| 4,673,205 A | * | 6/1987 | Drewek | 293/132 |
| 4,783,104 A | * | 11/1988 | Watanabe et al. | 293/102 |
| 4,961,603 A | * | 10/1990 | Carpenter | 293/102 |
| 5,303,973 A | * | 4/1994 | Fujii | 296/203.02 |
| 6,196,621 B1 | * | 3/2001 | VanAssche et al. | 296/187.09 |
| 6,227,321 B1 | * | 5/2001 | Frascaroli et al. | 180/68.4 |
| 6,375,252 B1 | * | 4/2002 | Cheron et al. | 296/203.02 |
| 6,533,347 B2 | * | 3/2003 | Sanada | 296/203.02 |
| 6,598,933 B2 | * | 7/2003 | Taguchi et al. | 296/203.02 |
| 6,705,670 B2 | * | 3/2004 | Forssell et al. | 296/187.09 |
| 6,808,228 B1 | * | 10/2004 | Campbell et al. | 296/193.02 |
| 6,880,667 B2 | * | 4/2005 | Gotou | 180/291 |
| 6,893,081 B2 | * | 5/2005 | Sasano et al. | 296/203.02 |
| 7,052,076 B2 | * | 5/2006 | Kim | 296/187.09 |
| 7,210,733 B2 | * | 5/2007 | Mouch et al. | 296/203.02 |
| 7,219,954 B2 | * | 5/2007 | Gomi et al. | 296/203.02 |
| 7,267,394 B1 | * | 9/2007 | Mouch et al. | 296/203.02 |

(Continued)

FOREIGN PATENT DOCUMENTS

| | | | | |
|---|---|---|---|---|
| JP | 59011944 A | * | 1/1984 | |
| JP | 60116540 A | * | 6/1985 | |

(Continued)

*Primary Examiner* — Glenn Dayoan
*Assistant Examiner* — Paul Chenevert
(74) *Attorney, Agent, or Firm* — Morgan, Lewis & Bockius LLP

(57) ABSTRACT

A front connection structure for a vehicle body may include a bumper back beam provided in a front portion of the vehicle body and connected to a side member in a traverse direction of the vehicle body, an apron upper member positioned on a side surface of the vehicle body in parallel to the side member, and a back beam side member mounted on an end portion of the bumper back beam in the traverse direction of the vehicle body and connected to a front end portion of the apron upper member.

8 Claims, 5 Drawing Sheets

U.S. PATENT DOCUMENTS

| | | | |
|---|---|---|---|
| 7,296,824 B2* | 11/2007 | Yasui et al. | 280/784 |
| 7,325,863 B2* | 2/2008 | Uchiyama | 296/193.09 |
| 7,341,299 B1* | 3/2008 | Baccouche et al. | 296/30 |
| 7,347,489 B2* | 3/2008 | Ziaja et al. | 296/193.03 |
| 7,469,956 B2* | 12/2008 | Yasuhara et al. | 296/187.09 |
| 7,614,658 B2* | 11/2009 | Yamada | 280/784 |
| 7,625,021 B2* | 12/2009 | Naik et al. | 293/120 |
| 7,810,878 B2* | 10/2010 | Nakamura et al. | 296/203.02 |
| 7,887,123 B2* | 2/2011 | Honji et al. | 296/187.09 |
| 8,002,338 B2* | 8/2011 | Yasuhara et al. | 296/203.02 |
| 8,256,831 B2* | 9/2012 | Abe et al. | 296/203.02 |
| 2005/0077711 A1* | 4/2005 | Yasui et al. | 280/735 |
| 2006/0284449 A1* | 12/2006 | Miyahara | 296/204 |
| 2007/0252412 A1* | 11/2007 | Yatsuda | 296/193.09 |
| 2008/0174150 A1* | 7/2008 | Yamada | 296/203.01 |
| 2009/0140546 A1* | 6/2009 | Okabe et al. | 296/187.09 |
| 2010/0259033 A1* | 10/2010 | Okabe et al. | 280/734 |
| 2011/0291445 A1* | 12/2011 | Patschicke et al. | 296/193.09 |
| 2012/0007373 A1* | 1/2012 | Boettcher et al. | 293/132 |
| 2012/0086225 A1* | 4/2012 | Matsuura et al. | 293/132 |
| 2012/0091742 A1* | 4/2012 | Paare et al. | 293/132 |
| 2012/0187719 A1* | 7/2012 | Fujii et al. | 296/187.09 |
| 2012/0205944 A1* | 8/2012 | Kido et al. | 296/187.09 |
| 2012/0248820 A1* | 10/2012 | Yasui et al. | 296/187.09 |
| 2012/0306221 A1* | 12/2012 | Tsuyuzaki et al. | 293/102 |

FOREIGN PATENT DOCUMENTS

| | | | |
|---|---|---|---|
| JP | 63263175 A | * | 10/1988 |
| JP | 02293277 A | * | 12/1990 |
| KR | 1020060094884 A | | 8/2006 |
| KR | 10-2008-0101984 A | | 11/2008 |
| KR | 1020100029653 A | | 3/2010 |

* cited by examiner

FRONT CONNECTION STRUCTURE FOR VEHICLE BODY

CROSS-REFERENCE TO RELATED APPLICATION

The present application claims priority to Korean Patent Application No. 10-2011-0055106, filed on Jun. 8, 2011 in the Korean Intellectual Property Office, the entire contents of which is incorporated herein for all purposes by this reference.

BACKGROUND OF THE INVENTION

1. Field of the Invention

The present invention relates to a front connection structure for a vehicle body, and more particularly, to a front connection structure for a vehicle body, which can disperse collision energy that occurs in a front portion of the vehicle body during vehicle collision.

2. Description of Related Art

In general, since a vehicle is a transport means that travels at high speed, passenger's safety is greatly required when collision occurs.

Since the passenger's safety is very important when head-on collision or rear-end collision occurs, it is important to secure rigidity against the impact of a vehicle body when the vehicle is designed.

In particular, when head-on collision of a vehicle occurs, components such as an engine and the like may be pushed into the interior of the vehicle, and thus it is required to improve an impact absorption effect against the head-on collision.

FIG. 1 is a view illustrating a front connection structure for a vehicle body in the related art.

According to the front connection structure for a vehicle body in the related art, as illustrated in FIG. 1, a bumper back beam 10 that is provided in the front portion of the vehicle body is connected to a side member 20, and an apron upper member 30 that is positioned on the side surface of the vehicle body in a direction parallel to the side member 20 is connected to the side member 20 through a connection member 40.

As described above, according to the front connection structure for the vehicle body in the related art, the side member 20 and the apron upper member 30 are connected to each other in a state where bumper back beam is connected to the side member 20, and thus the bumper back beam 10, the side member 20, and the apron upper damper 30 are connected to one another.

However, according to the front connection structure for the vehicle body in the related art, since the apron upper member 30 is connected to the bumper back beam through the side member 20 rather than being directly connected to the bumper back beam 10, only the side member 20 can support or disperse collision energy that is applied to the bumper back beam 10 when head-on collision of a vehicle occurs as illustrated in FIG. 2A. Accordingly, the bumper back beam 10 cannot endure the collision energy, and thus the collision energy is directly delivered to the vehicle body to cause problems in safety.

Further, even the corner portion of the bumper back beam 10 has no means for absorbing the collision energy as illustrated in FIG. 2B, and if collision occurs on the corner portion of the bumper back beam 10, the bumper back beam 10 and the side member 20 are damaged to lower the safety.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a front connection structure for a vehicle body, which can disperse collision energy that occurs in a front portion of the vehicle body during vehicle collision.

In one aspect of the present invention, a front connection structure for a vehicle body may include a bumper back beam provided in a front portion of the vehicle body and connected to a side member in a traverse direction of the vehicle body, an apron upper member positioned on a side surface of the vehicle body in parallel to the side member, and a back beam side member mounted on an end portion of the bumper back beam in the traverse direction of the vehicle body and connected to a front end portion of the apron upper member.

The front connection structure may further include a connection member provided between the back beam side member and the apron upper member to connect the back beam side member and the apron upper member to each other in a longitudinal direction of the vehicle body.

The back beam side member is in the form of a curved surface, and one side of the back beam side member is connected to the end portion of the bumper back beam and the other side of the back beam side member is connected to the connection member.

A front surface of the connection member is connected to the back beam side member, a rear surface of the connection member is connected to the apron upper member, and a lateral side of the connection member is connected to a side surface of the side member.

The back beam side member and the connection member are connected to each other through bolt fastening, the apron upper member and the connection member are connected to each other through welding, and the side member and the connection member are connected to each other through welding.

In another aspect of the present invention, the front connection structure for the vehicle body may further include a crash box provided between the bumper back beam and the side member to connect the bumper back beam and the side member to each other.

The front connection structure for the vehicle body may further include a connection member provided between the back beam side member and the apron upper member to connect the back beam side member and the apron upper member to each other in a longitudinal direction of the vehicle body.

The back beam side member is in the form of a curved surface, and one side of the back beam side member is connected to the end portion of the bumper back beam and the other side of the back beam side member is connected to the connection member.

A front surface of the connection member is connected to the back beam side member, a rear surface of the connection member is connected to the apron upper member, and a lateral side of the connection member is connected to a side surface of the side member, wherein the crash box may include a flange formed at an end thereof and the connection member is connected to the flange and the side surface of the side member.

As described above, according to an exemplary embodiment of the present invention, when collision occurs on the front portion or the side portion of the vehicle, load dispersion and impact absorption are maximized to improve safety of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
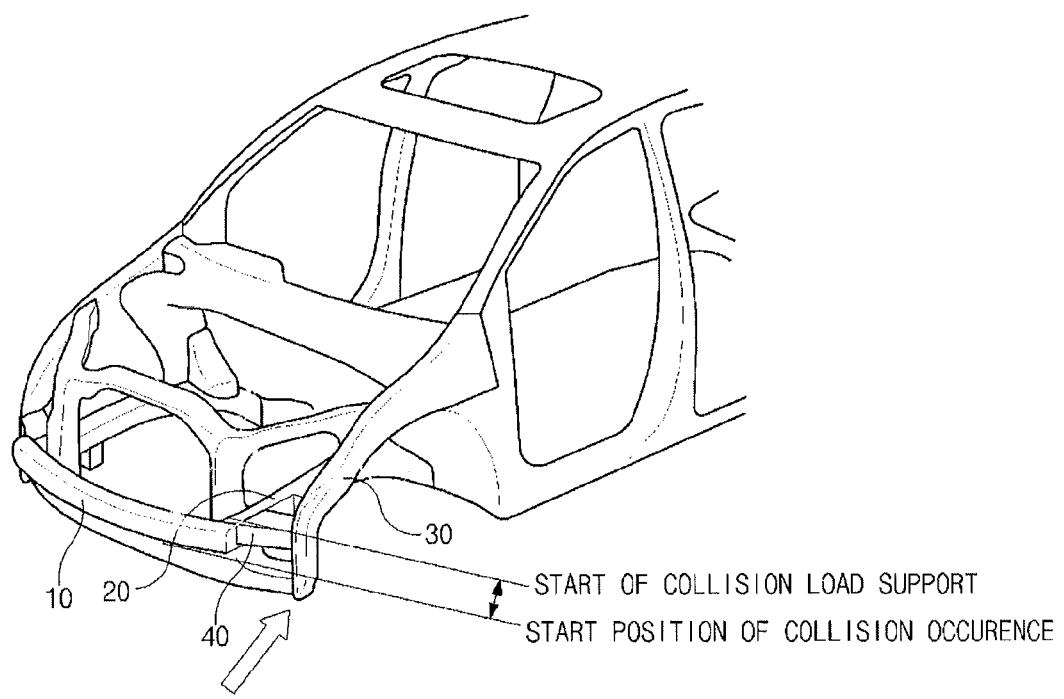
FIG. 1 is a view illustrating a front connection structure for a vehicle body in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, preferred embodiments of the present invention will be described with reference to the accompanying drawings. In the entire description of the present invention, the same drawing reference numerals are used for the same elements across various figures.

Figure 3:
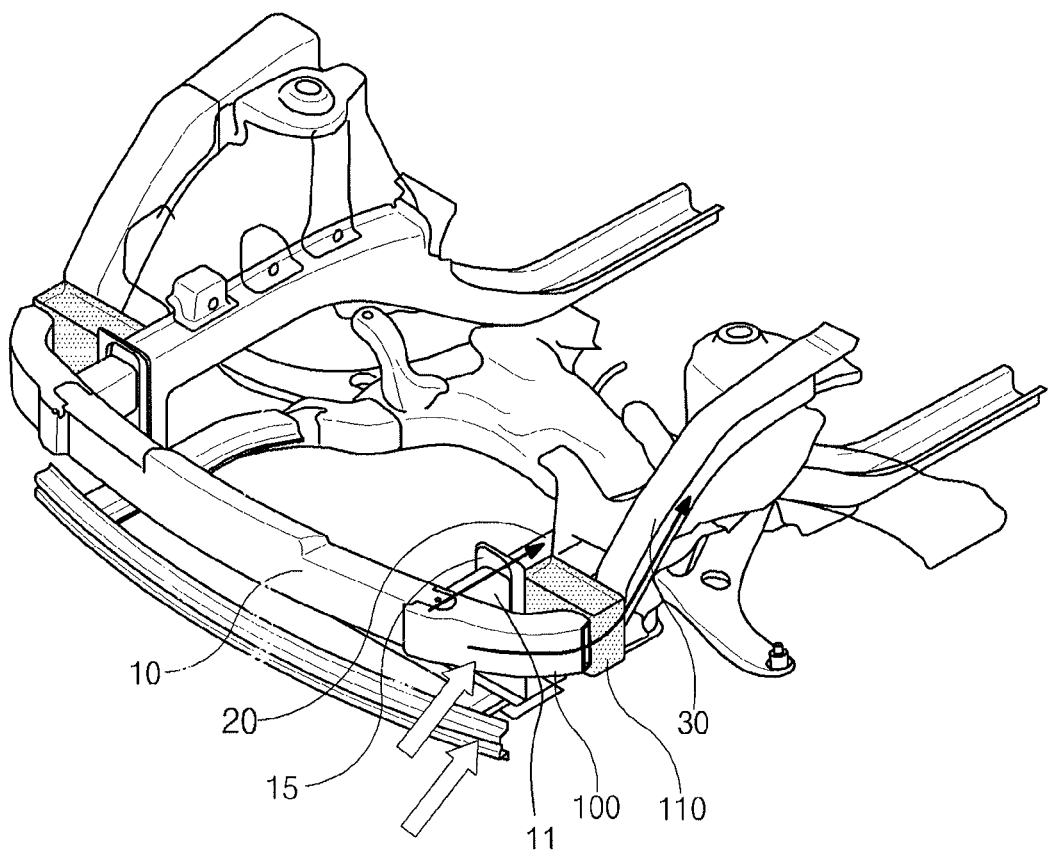
FIG. 3 is a view illustrating a front connection structure for a vehicle body according to an exemplary embodiment of the present invention.
Figure 4:
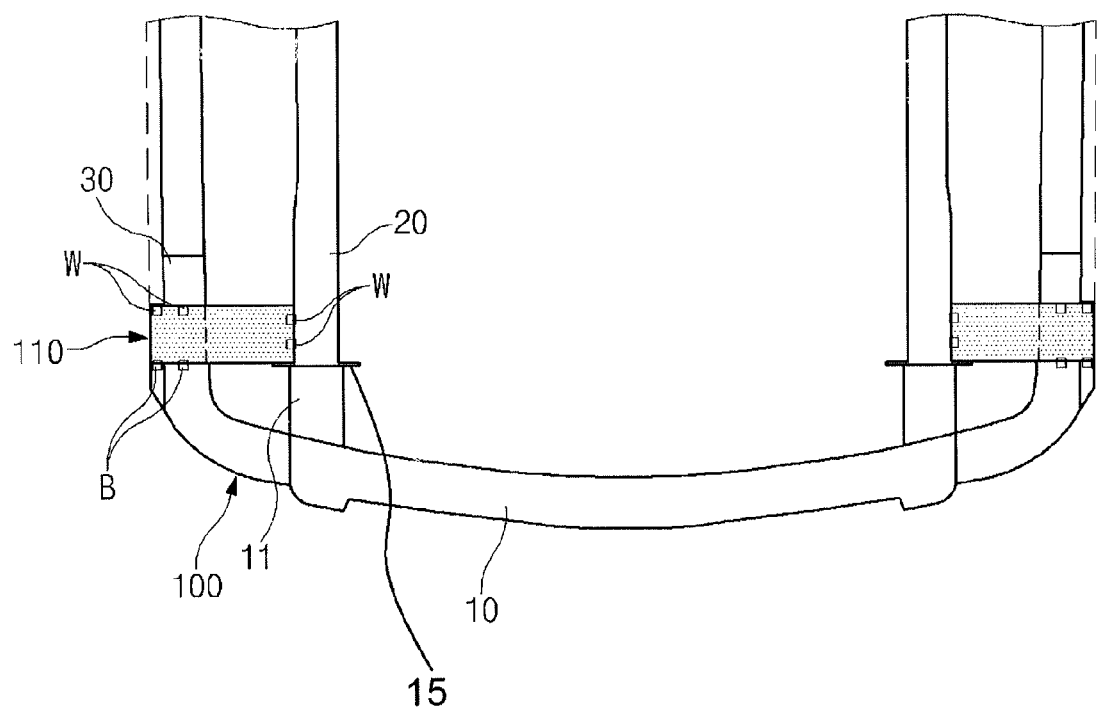
FIG. 4 is a plan view illustrating a front connection structure for a vehicle body according to an exemplary embodiment of the present invention.
Figure 5A:
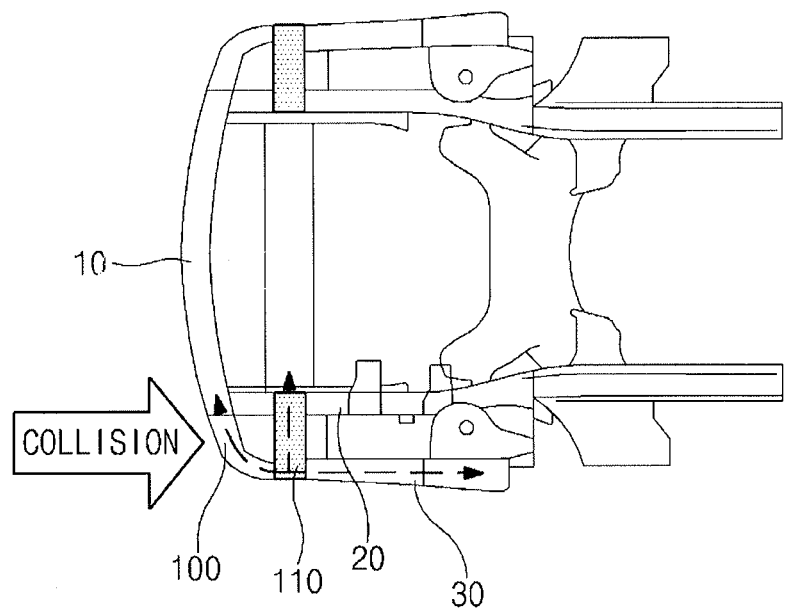
FIG. 5A is a view illustrating an impact absorption direction of a front portion of a vehicle when collision occurs on a corner portion of the vehicle in a front connection structure for a vehicle body according to an exemplary embodiment of the present invention.
Figure 5B:
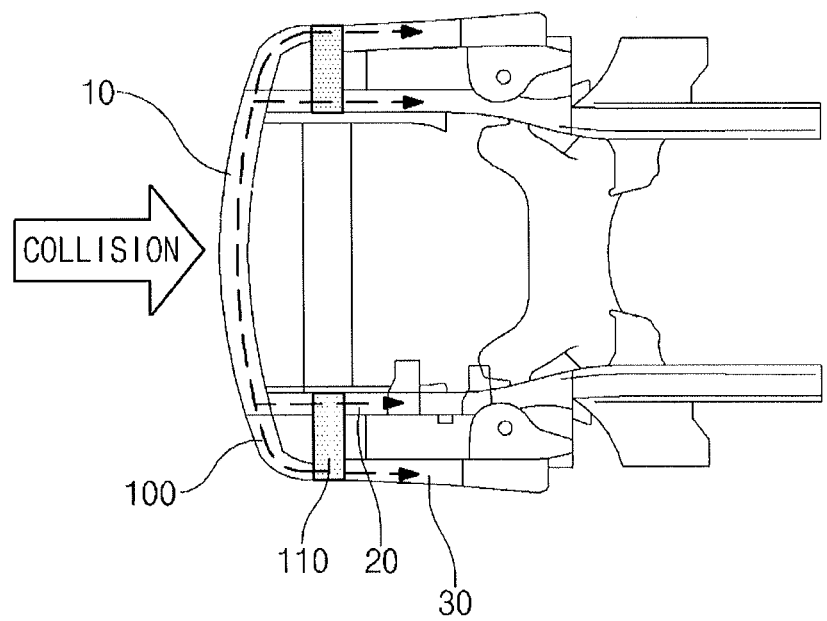
FIG. 5B is a view illustrating an impact absorption direction of a front portion of a vehicle when head-on collision occurs in a front connection structure for a vehicle body according to an exemplary embodiment of the present invention.

FIG. 3 is a view illustrating a front connection structure for a vehicle body according to an exemplary embodiment of the present invention, and FIG. 4 is a plan view illustrating a front connection structure for a vehicle body according to an exemplary embodiment of the present invention. FIGS. 5A and 5B are views illustrating an impact absorption direction of a front portion of a vehicle when collision occurs on a front portion or a corner portion of the vehicle in a front connection structure for a vehicle body according to an exemplary embodiment of the present invention.

According to the front connection structure for a vehicle body according to an exemplary embodiment of the present invention, as illustrated in FIGS. 3 to 5B, a bumper back beam 10 that is provided in a front portion of the vehicle body is connected to a side member 20 in a traverse direction, and an apron upper member 30 that is positioned on a side surface of the vehicle body is in parallel to the side member 20. Further, a back beam side member 100 is provided to be connected to the apron upper member 30, and thus when collision occurs on the front portion or corner portion of the vehicle, impact absorption is increased through load dispersion to improve the safety.

Hereinafter, respective constituent elements of the front connection structure for a vehicle body according to an exemplary embodiment of the present invention will be described in detail with reference to the accompanying drawings.

First, the front connection structure for a vehicle body according to an exemplary embodiment of the present invention basically includes the bumper back beam 10 provided in the front portion of the vehicle body, the side member 20 provided on the side surface of the vehicle body and connected to the bumper back beam 10 in the traverse direction, and the apron upper member 30 positioned on the side surface of the vehicle body in a direction that is parallel to the side member 20.

As illustrated in FIGS. 3 and 4, the back beam side member 100 that is in the form of a curved surface is provided on a corner portion at both ends of the bumper back beam 10, and when collision occurs on the corner portion, collision energy is easily delivered to the side member 20 and the apron upper member 30 through the back beam side member 100.

As described above, since the bumper back beam 10 is connected to the side member 20 and the back beam side member 100 is additionally provided at the end of the bumper back beam 10, a structure is formed in which the side member 20 is coupled in the traverse direction in a state where the bumper back beam 10 and the back beam side member 100 are connected to each other.

In this case, the end of the back beam side member 100 is positioned to be opposite the front end portion of the apron upper member 30.

Further, a rectangle-shaped connection member 110 is additionally provided at the end of the back beam side member 100 that is provided at both ends of the bumper back beam 10 to connect the apron upper member 30 that is positioned on the side surface of the side member 20 and the back beam side member 100 in the longitudinal direction.

On the other hand, a crash box 11 is additionally provided between the bumper back beam 10 and the side member 20 to connect the bumper back beam 10 and the side member to each other, and when head-on collision occurs, the impact of the side member 20 can be absorbed.

In this case, the front surface of one side of the connection member 110 is connected to the back beam side member 100, the rear surface of the one side of the connection member 110 is connected to the apron upper member 30, and the other side of the connection member 110 is connected to the side surface of the side member 20. Accordingly, the back beam side member 100 and the apron upper member 30 are connected together around the connection member 110 and the back beam side member and the apron upper member 30 are connected to the side member 20 to form a multi-connection structure.

Here, the back beam side member 100 and the connection member 110 are fastened through bolts B, the apron upper member 30 and the connection member 110 are fastened through welding W, and the side member 20 and the connection member 110 are also fastened through welding W to improve the binding force among the members.

In another exemplary embodiment of the present invention, the crash box 11 includes a flange 15 and a portion of the connection member 110 is further connected to the flange 15.

Hereinafter, the operation and the effect of the front connection structure according to an exemplary embodiment of the present invention will be described.

As illustrated in FIGS. 3 and 4, according to an exemplary embodiment of the present invention, the bumper back beam 10 that is provide in the front portion of the vehicle body is connected to the side member 20, the apron upper member 30 that is positioned on the side surface of the vehicle body is connected to the back beam side member 100 in a state where it is positioned in parallel to the side member 20, and the connection member 110 is additionally provided between the apron upper member 30 and the back beam side member 100. Accordingly, the back beam side member 100 and the apron upper member 30 are connected in the longitudinal direction through the back beam side member 100 and the connection member 110, and the connection member 110, which is connected to the back beam side member 100 and the apron upper member 30, is connected to the side member 20 in the traverse direction.

As described above, since the bumper back beam 10 and the back beam side member 100 are connected to each other, the back beam side member 100 is connected to the connection member 110, and the connection member 110 is connected to the apron upper member 30 and the side member 20, the main load can be dispersed from the initial stage of the head-on collision or the collision on the corner portion. In particular, it is possible to perform load dispersion of the side member 20 to which the collision energy is concentratively delivered, and thus the safety of a passenger can be improved.

Further, according to an exemplary embodiment of the present invention, as illustrated in FIG. 5A, when the collision occurs on the corner, the collision energy that is applied to the back beam side member 100 is dispersed in respective directions of the apron upper member 30, the connection member 110, and the bumper back beam 10 on the basis of the back beam side member 100.

On the other hand, as illustrated in FIG. 5B, when head-on collision occurs, the collision energy that is applied to the bumper back beam 10 is primarily absorbed by the back beam side member 100, and the collision energy is dispersed in respective directions of the side member 20 and the apron upper member 30 to reduce the amount of impact.

Figure 2A:
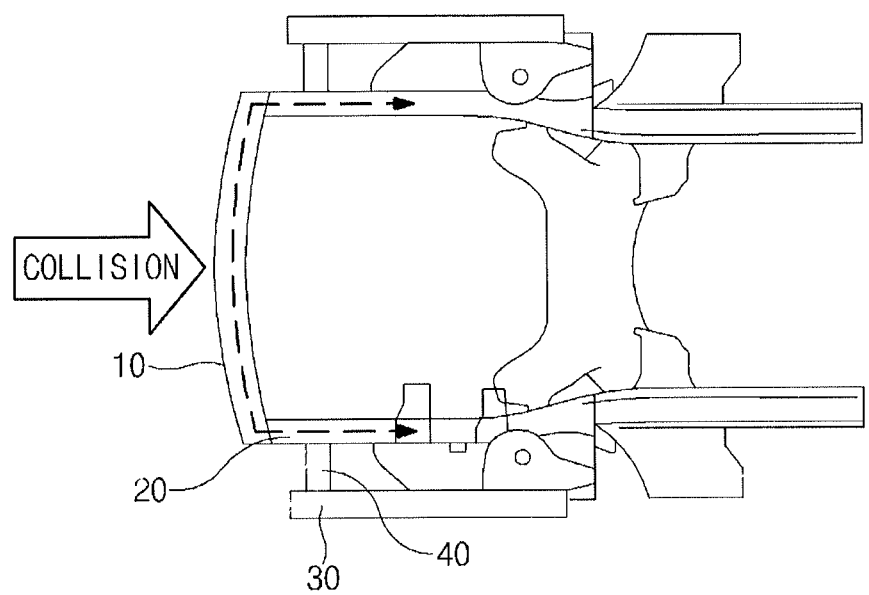
FIG. 2A is a view illustrating an impact absorption direction of a front portion of a vehicle when head-on collision occurs in a front connection structure for a vehicle body in the related art.
Figure 2B:
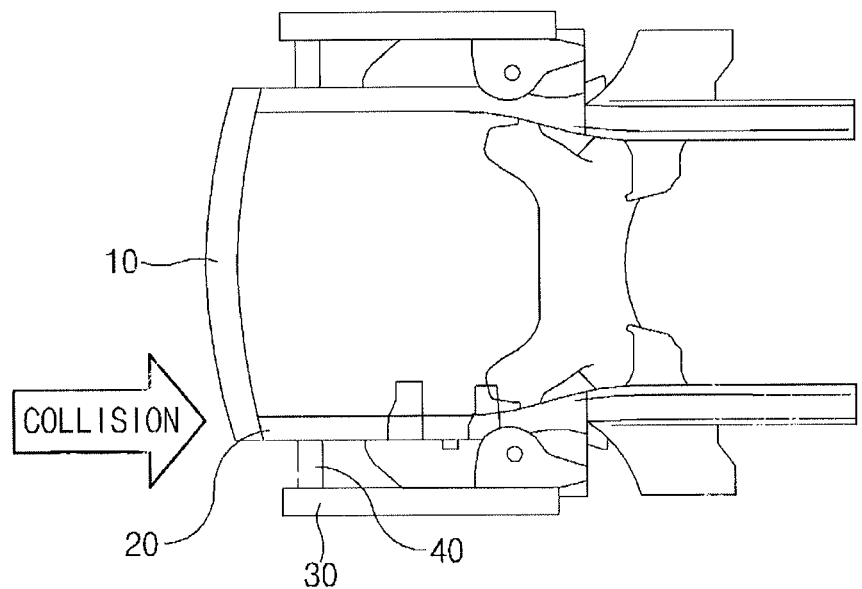
FIG. 2B is a view illustrating a deformation direction of a front portion of a vehicle when collision occurs on a corner portion of the vehicle in a front connection structure for a vehicle body in the related art.

In the related art, when head-on collision occurs as illustrated in FIG. 2A, the collision energy is directly delivered to the side member 20, and when collision occurs on the corner as illustrated in FIG. 2B, the collision energy is not sufficiently absorbed to cause the damage of the bumper back beam and the side member. By contrast, according to an exemplary embodiment of the present invention, when collision occurs on the corner as illustrated in FIG. 5A, the collision energy is dispersed in three directions on the basis of the connection member 110, and when head-on collision occurs as illustrated in FIG. 5B, the collision energy is dispersed in two directions of the side member 20 and the apron upper member 30. Accordingly, the safety of the driving vehicle is improved, the energy is prevented from being concentratively delivered to the vehicle on the opposite side to improve the mutual safety, and invasion from the outside of the vehicle is maximally impeded to improve the merchantability.

Further, in the related art, no connection structure is provided between a position in which the occurrence of collision starts (on the bumper back beam side) and a position in which the collision load is supported (on the apron upper member side), and when the collision occurs on the corner side of the vehicle as illustrated in FIG. 1, the collision load support time is delayed for a predetermined period. By contrast, according to an exemplary embodiment of the present invention, the back beam side member 100 is connected to the apron upper member 30 and the side member 20 in a state where the bumper back beam 10 and the back beam side member 100 are connected to each other, and when the collision occurs on the corner side as illustrated in FIG. 3, the collision load can be supported from the initial stage of the collision to improve the safety.

As described above, according to the front connection structure for a vehicle according to an exemplary embodiment of the present invention, the bumper back beam provided in the front portion of the vehicle body is connected to the side member, the apron upper member is provided on the surface of the vehicle body in parallel to the side member, and the back beam side member, the end of which is connected to the connection member, is provided at the end of the bumper back beam to connect the apron upper member and the back beam side member to each other. Accordingly, when the collision occurs on the front portion or the side portion of the vehicle, the load dispersion and the impact absorption are maximized to improve the safety of the vehicle.

For convenience in explanation and accurate definition in the appended claims, the terms "front" and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A front connection structure for a vehicle body including:
   a bumper back beam provided in a front portion of the vehicle body and connected to a side member in a traverse direction of the vehicle body;
   an apron upper member positioned on a side surface of the vehicle body in parallel to the side member;
   a back beam side member mounted on an end portion of the bumper back beam in the traverse direction of the vehicle body and connected to a front end portion of the apron upper member; and a connection member provided between the back beam side member and the apron upper member to connect the back beam side member and the apron upper member to each other in a longitudinal direction of the vehicle body.

2. The front connection structure for the vehicle body according to claim 1, wherein the back beam side member is in the form of a curved surface, and one side of the back beam side member is connected to the end portion of the bumper back beam and the other side of the back beam side member is connected to the connection member.

3. The front connection structure for the vehicle body according to claim 1, wherein a front surface of the connection member is connected to the back beam side member, a rear surface of the connection member is connected to the apron upper member, and a lateral side of the connection member is connected to a side surface of the side member.

4. The front connection structure for the vehicle body according to claim 3, wherein the back beam side member and the connection member are connected to each other through bolt fastening, the apron upper member and the connection member are connected to each other through welding, and the side member and the connection member are connected to each other through welding.

5. The front connection structure for the vehicle body according to claim 1, further including a crash box provided between the bumper back beam and the side member to connect the bumper back beam and the side member to each other.

6. The front connection structure for the vehicle body according to claim 5, wherein the back beam side member is in the form of a curved surface, and one side of the back beam side member is connected to the end portion of the bumper back beam and the other side of the back beam side member is connected to the connection member.

7. The front connection structure for the vehicle body according to claim 5, wherein a front surface of the connection member is connected to the back beam side member, a rear surface of the connection member is connected to the apron upper member, and a lateral side of the connection member is connected to a side surface of the side member.

8. The front connection structure for the vehicle body according to claim 7, wherein the crash box includes a flange formed at an end thereof and the connection member is connected to the flange and the side surface of the side member.

* * * * *